United States Patent
Krause

(10) Patent No.: US 9,581,967 B1
(45) Date of Patent: Feb. 28, 2017

(54) MOTION COMPENSATED MULTI-WAVELENGTH DIGITAL HOLOGRAPHY

(71) Applicant: LOCKHEED MARTIN COHERENT TECHNOLOGIES, INC., Louisville, CO (US)

(72) Inventor: Brian Krause, Erie, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 225 days.

(21) Appl. No.: 14/591,879

(22) Filed: Jan. 7, 2015

(51) Int. Cl.
| | |
|---|---|
| H04N 13/00 | (2006.01) |
| G03H 1/32 | (2006.01) |
| G03H 1/08 | (2006.01) |
| G03H 1/14 | (2006.01) |
| G03H 1/04 | (2006.01) |
| H04N 5/247 | (2006.01) |
| G01S 17/89 | (2006.01) |

(52) U.S. Cl.
CPC ............ *G03H 1/32* (2013.01); *G01S 17/895* (2013.01); *G03H 1/0465* (2013.01); *G03H 1/0866* (2013.01); *G03H 1/14* (2013.01); *H04N 5/247* (2013.01); *G03H 2001/0467* (2013.01); *G03H 2001/0469* (2013.01); *G03H 2001/0875* (2013.01)

(58) Field of Classification Search
None
See application file for complete search history.

(56) References Cited

U.S. PATENT DOCUMENTS

| | | | | |
|---|---|---|---|---|
| 5,694,216 | A * | 12/1997 | Riza | .................. G01B 9/02004 356/485 |
| 6,646,975 | B1 * | 11/2003 | Uchizaki | ............... B82Y 20/00 369/112.15 |
| 7,986,397 | B1 | 7/2011 | Tiemann et al. | |
| 8,227,735 | B1 | 7/2012 | Marron | |

(Continued)

OTHER PUBLICATIONS

Thurman, Samuel T. et al., "Phase-error correction in digital holography," J. Opt. Soc. Am. A, Apr. 2008, pp. 983-994, vol. 25, No. 4.

(Continued)

*Primary Examiner* — Tracy Y Li
(74) *Attorney, Agent, or Firm* — McDermott Will & Emery LLP

(57) ABSTRACT

A holography imaging system includes a first laser, a second laser, a transmitter optical system, a receiver optical system, and a detector array. The first laser has a constant frequency, and the second laser has a non-constant frequency. The transmitter optical system can illuminate a target simultaneously using portions of the first and second laser signals. The receiver optical system can focus a returned light onto the detector array. A first and second illumination point sources can direct portions of the first and second laser signals onto the detector array. The first and second illumination point sources are located in-plane with a pupil of the receiver optical system. The system can detect simultaneously holograms formed on the detector array based on the returned light and the portions of the first and second laser signals directed by the first and second illumination point sources.

20 Claims, 13 Drawing Sheets

(56) References Cited

U.S. PATENT DOCUMENTS

| | | | | |
|---|---|---|---|---|
| 2006/0262324 | A1* | 11/2006 | Hays | G01N 21/47 356/519 |
| 2009/0147239 | A1* | 6/2009 | Zhu | G01S 7/285 356/3.12 |
| 2012/0326039 | A1* | 12/2012 | Demers | G01J 3/10 250/338.4 |
| 2012/0327039 | A1* | 12/2012 | Kukulj | G06F 3/0428 345/175 |
| 2015/0355327 | A1* | 12/2015 | Goodwin | G01S 17/325 356/5.01 |

OTHER PUBLICATIONS

Marron, Joseph C. et al., "Atmospheric turbulence correction using digital holographic detection: experimental results," Optics Express, Jun. 2009, pp. 11638-11651, vol. 17, No. 14.

Paxman, R. G. et al., "Aberration correction of speckled imagery with an image-sharpness criterion," Statistical Optics, 1988, pp. 37-47, vol. 976, International Society for Optics and Photonics.

Fienup, J. R. et al., "Aberration correction by maximizing generalized sharpness metrics," J. Opt. Soc. Am. A, Apr. 2003, pp. 609-620, vol. 20, No. 4.

Höft, Thomas et al., "Two-Wavelength Digital Holography," Digital Holography and Three-Dimensional Imaging, 2007, (DTuD1.pdf), 3 pages, Optical Society of America.

Gatt, Philip J. et al., "Coherent Laser Radar Range Precision for Range Resolved and Unresolved Targets," Proceedings of the 11th Coherent Laser Radar Conference, 2001, 4 pages.

Marron, Joseph C. et al., "Holographic laser radar," Optics letters, Mar. 1993, pp. 385-387, vol. 18, No. 5, Optical Society of America.

Marron, Joseph C. et al., "Three-Dimensional Imaging Using a Tunable Laser Source," Optical Engineering, Jan. 2000, pp. 47-51, vol. 39, Society of Photo-Optical Instrumentation Engineers.

Carrara, Walter G. et al., "Spotlight synthetic aperture radar-Signal processing algorithms" (Book), 1995, p. 222 (Table 5.5), Artech House, Norwood, MA, USA.

* cited by examiner

MOTION COMPENSATED MULTI-WAVELENGTH DIGITAL HOLOGRAPHY

FIELD

The disclosure relates in general to laser radar three-dimensional imaging and synthetic aperture ladar and relates, in particular to, for example, without limitation, holography imaging systems and methods.

BACKGROUND

In the field of coherent laser radar, target motion or vibration presents a considerable challenge to coherent combination of data over a long dwell time. Target motion can cause speckle decorrelation of the reflected light within short time scales (100 nanoseconds (ns)—a few microseconds (µs)). In some applications, it is desirable to coherently combine data over much longer time scales (10's of miliseconds (ms) or longer).

The description provided in the background section should not be assumed to be prior art merely because it is mentioned in or associated with the background section. The background section may include information that describes one or more aspects of the subject technology.

SUMMARY

One or more implementations of the subject disclosure are illustrated by and/or described in connection with one or more figures and are set forth in the claims.

DETAILED DESCRIPTION

Figure 1A:
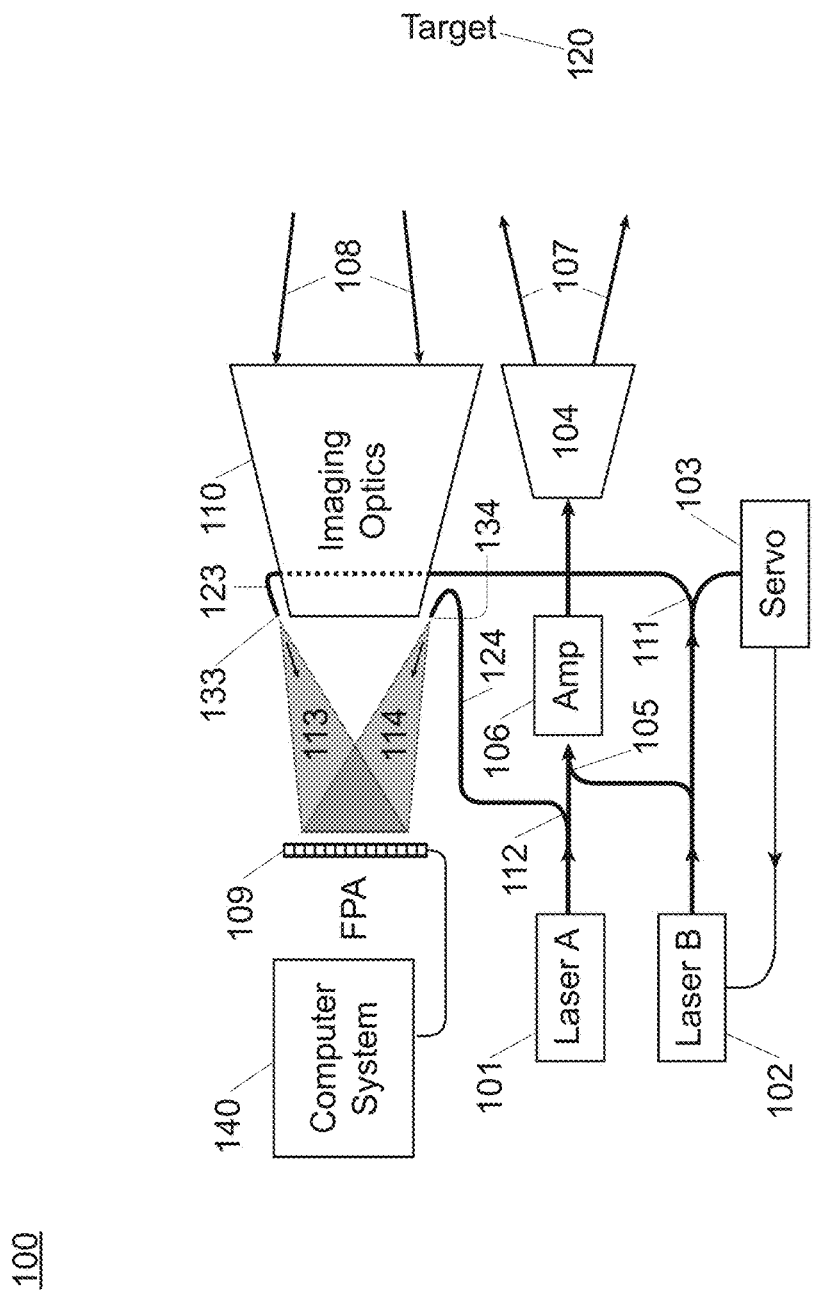
FIG. 1A illustrates a schematic diagram of an exemplary embodiment of the subject technology.

The detailed description set forth below is intended as a description of various configurations of the subject technology and is not intended to represent the only configurations in which the subject technology may be practiced. As will be realized, the subject technology is capable of other and different configurations and its several details are capable of modification in various other respects, all without departing from the scope of the subject technology.

One or more aspects of the subject technology relate to laser radar 3D imaging and synthetic aperture ladar, and, in particular, for example, without limitation, relate to motion compensated multi-wavelength digital holography. One or more aspects of the subject technology relate to motion compensated multi-wavelength digital holography for 3D imaging and synthetic aperture ladar.

In one or more implementations, the subject technology provides a motion compensated digital holography system that solves a speckle decorrelation problem (e.g., the speckle decorrelation problem arising from target motion and/or vibration in coherent laser radars), allowing multi-wavelength coherent data combination over long time scales. The disclosure below provides various approaches of digital holography and discusses two applications where long duration coherent data combination is desirable and enabled by the subject technology: 3D imaging and synthetic aperture ladar. In addition, the subject technology is compared to the various alternative approaches. Furthermore, the disclosure provides examples of various implementations of the subject technology.

Various Approaches

Digital holography is a method of coherent laser radar (ladar) where the object or target is flood-illuminated with a laser signal and the reflected light (or the returned laser signal) from the target is detected by an array of detectors located in an image plane of an optical system. The reflected light is interfered with one or more off-axis reference beams (local oscillators) to form holograms on the focal plane array. The recorded holograms have interference fringes with an orientation corresponding to the pupil plane lateral geometry of the local oscillators relative to the receiver aperture.

Computing a two-dimensional (2D) Fourier transformation on the recorded data produces complex-valued pupil plane field data. Image plane complex-valued data can then be computed by inverse Fourier transformation of the pupil plane field data after appropriate spatial filtering. Many advanced capabilities are enabled by this method of detecting both the intensity and phase of the returned light. For example, aberrations caused by imperfect optics or refractive turbulence in the atmosphere may be computed and removed digitally from the coherent imagery using image sharpness maximization.

Digital holography may be used to produce three-dimensional (3D) images of an object by operating at two wavelengths and computing the phase difference between coherent images recorded at each wavelength. This method is referred to as dual-wavelength 3D imaging. There are three limitations of dual-wavelength 3D imaging that are relevant in comparison to the subject technology, which are discussed below. First, there is range ambiguity in dual-wavelength 3D imaging. The ambiguity interval, $R_{amb}$, is related to the frequency difference of the two wavelengths, $\Delta f$, by $$R_{amb} = \frac{c}{2\Delta f} \quad (1)$$

where c is the speed of light. This ambiguity causes phase wraps across an image. Two dimensional phase unwrapping algorithms may be applied to combat phase wrapping, but these algorithms can fail for objects that have range discontinuities. An example of a range discontinuity is the range discontinuity between the roof of a building and the ground, when viewed from an airborne or space based platform.

The ambiguity interval of a dual-wavelength system may be increased to reduce the phase wrapping problem, but only at the expense of range precision since range precision, $c_R$, scales linearly with the ambiguity interval. The equation relating the two comes from the Cramer-Rao lower bound, $$\sigma_R = \frac{R_{amb}}{2\pi\sqrt{N_{avg}CNR}} \quad (2)$$

where $N_{avg}$ is the number of incoherent averages and CNR is the carrier-to-noise ratio.

The second limitation of dual-wavelength 3D imaging is that it provides no range resolution. 3D information in each pixel is computed by calculating a difference of the phase from each wavelength. The result is a single value for range in each pixel. If the pixel field of view contains multiple down range targets, the phase difference calculation will produce a range estimate that combines the data from all down range targets.

The third limitation of dual-wavelength 3D imaging is that data can usually not be coherently combined from frame to frame due to target motion and/or vibration.

In another approach, a motion compensated frequency-modulated continuous-wave (FMCW) system may solve the multi-frame coherent data combination problem for 3D imaging in a different way than the subject technology. The FMCW system employs temporal heterodyne detection where one or more configurations of the subject technology employ spatial heterodyne detection. The FMCW approach does not have a way to separate the chirped laser signal from the pilot reference laser signal, so a nonlinear operation is required to put power into the frequency difference of the two heterodyne beat signals.

The motion compensated FMCW approach has two key limitations. First, the nonlinear operation required in the FMCW method creates significant excess noise due to self-mixing of shot noise. This places much high power requirements on the laser transmitter to overcome the excess noise. Second, to make the FMCW approach applicable to realistic degrees of target motion, the nonlinear operation should occur within the camera prior to digitization. This means that custom camera electronics development is required. The above discussion describes multi-frame 3D imaging which requires long duration coherent data combination.

A second application where long duration coherent data combination is required is synthetic aperture ladar. Synthetic aperture ladar is a method to take advantage of the translation of a moving platform to form a synthetic aperture with length exceeding the size of the real aperture by coherently combining data collected while the synthetic aperture is traversed. This approach allows imaging a target with cross range resolution exceeding the diffraction limit of the real aperture. Since the data is collected sequentially in time while the aperture translates, long duration coherent data combination is required. For a typical airborne imaging scenario, the aperture translation time is 10's of ms, which is far longer than typical vibrating or moving target scattered light coherence times, which are approximately 100 ns to a few μs. Thus, target motion presents a significant challenge to synthetic aperture ladar. In particular, uncorrelated space-variant motion on the order of the wavelength will ruin cross range compression.

There are synthetic aperture radar (SAR) algorithms to correct for various kinds of correlated motion, for example, subpatch processing for rigid body motion and space-variant refocus for bending and flexing. However, moving or vibrating targets will likely have significant uncorrelated components to the motion relative to the small scale of optical wavelengths. Examples of vibrating targets include tanks or vehicles with the engine running or building walls vibrating from a heating, ventilation, and air-conditioning (HVAC) system. The SAR rule of thumb for uncompensated wide band phase error is 0.07 radians root mean square (RMS). For a 10 GHz SAR system, this rule of thumb indicates that allowable uncompensated motion is 170 μm RMS. By comparison, for a synthetic aperture ladar system operating at a 200 THz carrier frequency, allowable motion is only 8.4 nm RMS.

Examples of Aspects and Advantages of Subject Technology

In one or more implementations, the subject technology provides a motion compensated digital holography system that addresses the speckle decorrelation problems arising from the target motion and/or vibration in coherent laser radars. The motion compensated digital holography system allows multi-wavelength coherent data combination over long time scales.

In one or more implementations, the subject technology overcomes various limitations of the dual-wavelength 3D imaging discussed above. First, while dual-wavelength 3D imaging produces range ambiguity, in one or more aspects, the subject technology avoids range ambiguity while providing fine range precision. Second, while dual-wavelength 3D imaging provides no range resolution, in one or more aspects, the subject technology can provide a range resolving capability by utilizing a plurality of wavelengths. A system of the subject technology can provide multiple range reports within a single pixel field of view. The third limitation of dual-wavelength 3D imaging is that data can usually not be coherently combined from frame to frame due to target motion. By contrast, in one or more aspects, the subject technology enables coherent data combination across frames, boosting the waveform CNR that allows operation at significantly lower laser power for equal range precision performance.

According to one or more aspects, the subject technology can achieve these advantages in 3D imaging, over the dual-wavelength 3D imaging approach described above, by operating at a plurality of wavelengths over multiple frames. Multi-frame operation in the 3D imaging application is why long duration coherent data combination is desirable. The total dwell duration is determined by the camera frame rate and the number of frames desired. High-speed digital camera frame rates are near 1 kHz, depending on the array size. It is often desirable to coherently process 10's of frames, leading to a total dwell time of 10's of miliseconds. This is much longer than typical moving target scattered light coherence times, which are approximately 100 ns to a few µs.

It is conceptually possible to perform multi-wavelength imaging in a single frame (short duration) by employing angular multiplexing of many local oscillators. This approach has two significant limitations. First, simultaneously collecting N wavelengths carries a shot noise penalty of N, reducing the CNR by a factor of N. Furthermore, for a master oscillator power amplifier source architecture, where all N wavelengths are amplified by a single common optical amplifier, there is an additional CNR penalty of N due to sharing of available power among the N wavelengths, resulting in a $N^2$ penalty. For values of N greater than 10, this CNR penalty quickly becomes too large. The second significant limitation is that angular multiplexing with many wavelengths requires very high spatial oversampling, which limits the field of view.

For an imaging configuration in which the target, sensor and atmosphere are highly static, multi-frame coherent combination can be achieved without motion compensation. However, a sufficiently static arrangement can only be achieved in the laboratory. To be sufficiently static, the magnitude of target motion, including bending, flexing, or vibrating, must be much less than the laser wavelength. Furthermore, target rigid body rotation must be less than D/R, where D is the receiver aperture diameter and R is the range to the target. For airborne imaging applications, this could be as low as a few µ rads. Therefore, any application outside of the laboratory could not employ optical multi-frame coherent data combination without motion compensation.

In one or more aspects, the subject technology differs from the FMCW approach described above in many beneficial ways. While the FMCW approach does not have a way to separate the chirped laser signal from the pilot reference laser signal, in one or more aspects, the subject technology employs angular multiplexing of the local oscillators to separate the data in the spatial frequency domain, enabling a straightforward phase reference as discussed in greater detail below. Furthermore, unlike the FMCW approach, which creates significant excess noise due to self-mixing of shot noise, in one or more aspects, the subject technology does not have this excess noise problem due to the receiver angular multiplexing. Moreover, while the FMCW approach requires custom camera electronics development, in one or more aspects, the subject technology does not require such custom development. In one or more aspects, because the subject technology does not require the nonlinear operation, it is compatible with currently available commercial cameras without any need for customization or modification.

In addition, in one or more aspects, the subject technology can solve the synthetic aperture ladar target motion sensitivity problem, discussed above as relating to the synthetic aperture ladar method, by employing a radio frequency (RF) offset between the chirped and the reference laser signals as discussed in more detail below. The system would effectively operate at a synthetic wavelength, reducing sensitivity to target motion at the expense of increasing the data collection time.

Various Implementations of Subject Technology

FIG. 1 illustrates a schematic diagram of an example of a hardware implementation of the subject technology. In this example, a digital holography imaging system (100) employs two lasers (101 and 102), where the frequency of the laser signal of laser A (101) is held constant, and the frequency of the laser signal of laser B (102) is linearly tuned, or chirped during data collection. In this example, the frequency of the laser signal of laser A (101) is constant over time, where the frequency of the laser signal of laser B (102) varies over time (or non-constant over time). The constant frequency laser signal (namely, the laser signal of laser A (101)) serves as a phase reference signal for the coherent data combination. The linearity of the frequency tuning of the laser signal of laser B (102) can be ensured by use of a frequency control servo (103). The frequency control servo may detect a delayed self-heterodyne signal and lock the signal to an RF reference signal that determines the desired chirp rate. The frequency control servo (103) is not needed in all implementations of the subject technology since the global phase compensation calculation described below can remove the effect of some frequency chirp nonlinearity.

According to one or more aspects, the subject technology may also be implemented with stepped frequency changes in the frequency of the laser signal of laser B (102) instead of linear tuning described above. In either case, the outputs of laser A and laser B are transmitted to a target (120) through a transmitter optical system (104), and may be combined (105) using a combiner (not shown) and/or amplified using an amplifier (106) before being transmitted. The target is flood-illuminated (107), and scattered light (108) from the target is returned and received by imaging optics (110) having one or more lens. The returned light is focused onto a focal plane array (FPA) (109).

Part of each laser signal of laser A (101) and laser B (102) is split off (112 and 111) so that such part of each laser signal can serve as a local oscillator. The local oscillators are directed (113 and 114) through optical fibers (123 and 124) toward the focal plane array (109). The digital holography imaging system (100) may also include a computer system (140) to receive and process images from the focal plane array.

In one or more implementations, a focal plane array may include a camera. In one or more implementations, the amplifier (106) may include one or more amplifiers. In one implementation, a combiner may be located after the lasers A and B but before the amplifier (106). In another implementation, a first amplifier may be located after laser A, a second amplifier may be located after laser B, and a combiner may be located after the first and second amplifiers. In one or more implementations, a detector array is a focal plane array.

Figure 1B:
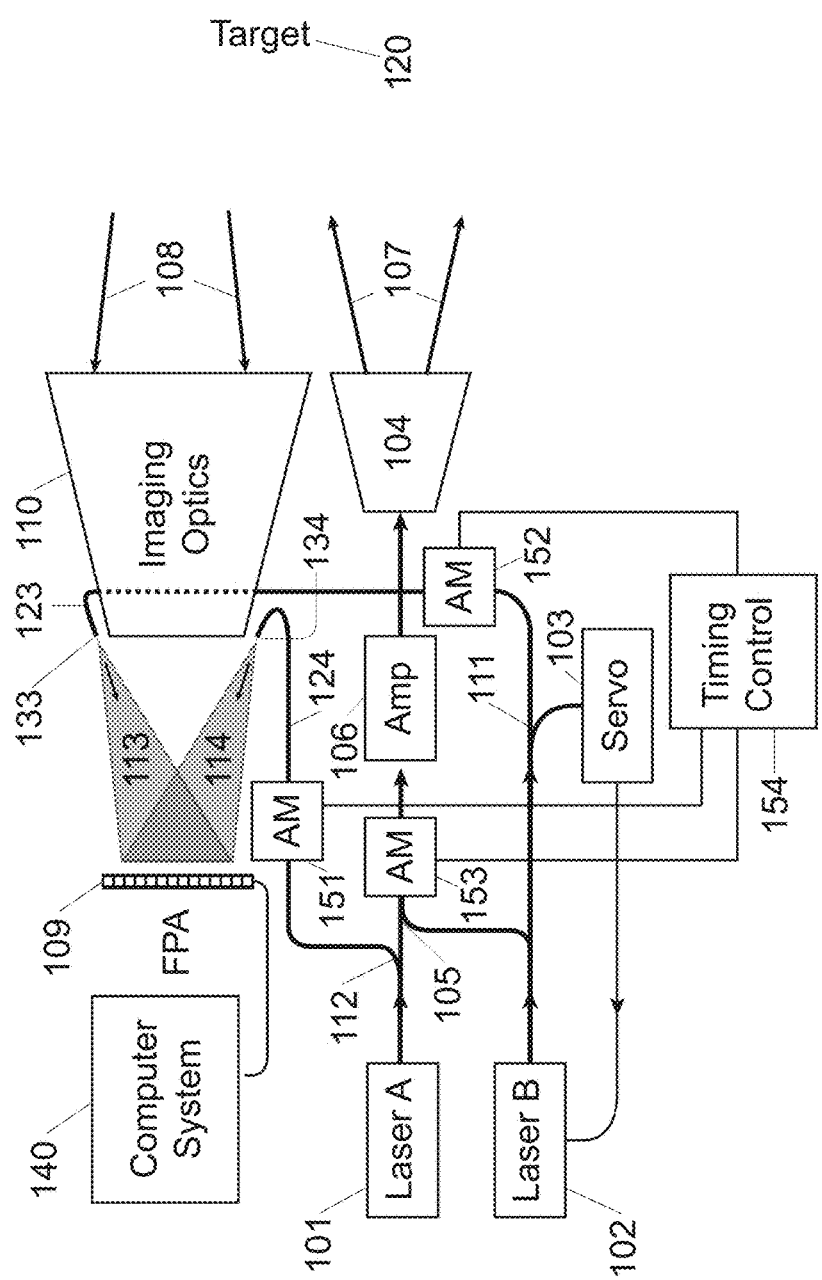
FIG. 1B illustrates a schematic diagram of another exemplary embodiment of the subject technology.

FIG. 1B illustrates a schematic diagram of another exemplary embodiment of the subject technology. A digital holography imaging system shown in FIG. 1B is the same as the digital holography imaging system shown in FIG. 1A, except that the digital holography imaging system shown in FIG. 1B includes one or more amplitude modulators for pulsed mode operation. Local oscillator light from laser A (101) is modulated into a short pulse by an amplitude modulator (AM) (151). Likewise, local oscillator light from laser B (102) is modulated into a short pulse by another amplitude modulator (152). The transmitted light is modulated after combining lasers A and B at a combiner (105) (not shown) by an amplitude modulator (153). A timing control system (154) controls the timing of the amplitude modulators to cause temporal overlap of the returned signal pulse (108) with both of the local oscillator pulses (113 and 114).

Figure 2:
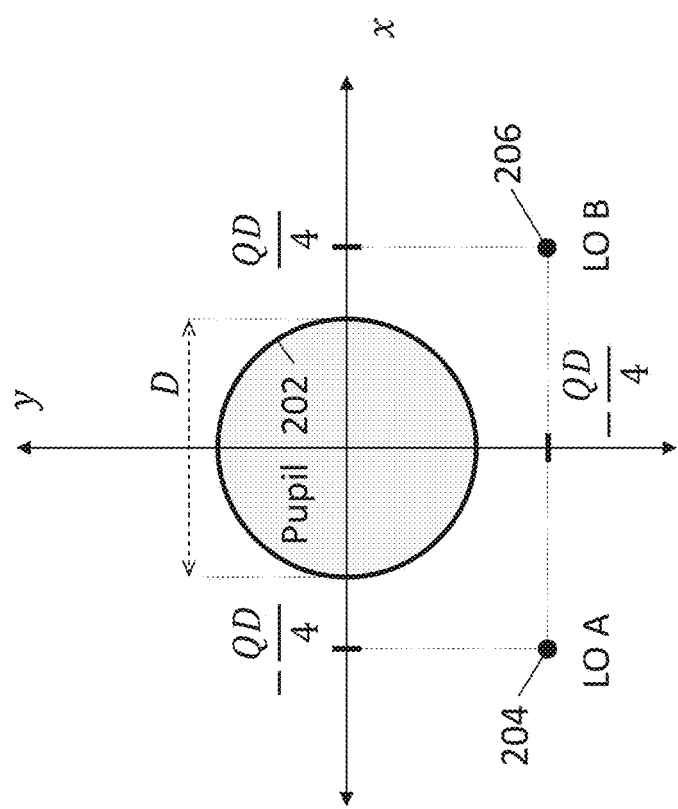
FIG. 2 illustrates an example of the lateral geometric arrangement for the placement of the two local oscillator point sources relative to the exit pupil of a receiver optical system.

The position of the output fiber tips (133 and 134) of the optical fibers (123 and 124) are in-plane with the exit pupil of the imaging optics (110) of the receiver optical system and arranged according to the lateral geometry shown in FIG. 2. FIG. 2 illustrates the geometry with a pupil plane coordinate system where the exit pupil (202) is centered at the origin, LO A (204) is located at (x,y) coordinates $$\left(-\frac{QD}{4}, -\frac{QD}{4}\right),$$

and LO B (206) is located at coordinates $$\left(\frac{QD}{4}, -\frac{QD}{4}\right),$$

where D is the exit pupil diameter, and Q is the sampling ratio, defined as $$Q = \frac{z_i \lambda}{Dp}, \quad (3)$$

where $z_i$ is the distance between the exit pupil and the focal plane array, λ is the laser wavelength, and p is the pixel pitch of the focal plane array. For LO A, λ is the wavelength of the laser A. For LO B, λ is the wavelength of the laser B. Thus, the output fiber tips (133 and 134) for local oscillators LO A and LO B (204 and 206) serve as two point source illuminators (or two illumination point sources) in the pupil plane of the receiver optical system.

In one or more aspects, the returned light associated with the laser signal of laser A will interfere with local oscillator A (204) to form a first hologram A on the FPA. Likewise, the returned light associated with the laser signal of laser B will interfere with local oscillator B (206) to form a second hologram B superimposed on the FPA. Target illumination and detection at the two wavelengths occur simultaneously. The recorded frame is a superposition of the first hologram A and the second hologram B.

In one or more implementations, simultaneous detection is accomplished by the angular multiplexing of the two wavelengths that enable simultaneous recording of coherent images at each wavelength, as explained in more detail below. In one or more implementations, simultaneous detection is the same as simultaneous illumination of the focal plane array. In one or more implementations, simultaneous illumination can be accomplished by illuminating the focal plane array simultaneously using the returned light and the local oscillators (LO A and LO B). In one or more implementations, the returned light may be a returned pulse, and the two local oscillators can be two pulses. In one or more implementations, simultaneous illumination can be accomplished by superimposing and forming the first hologram A and the second hologram B on the focal plane array simultaneously.

Figure 3:
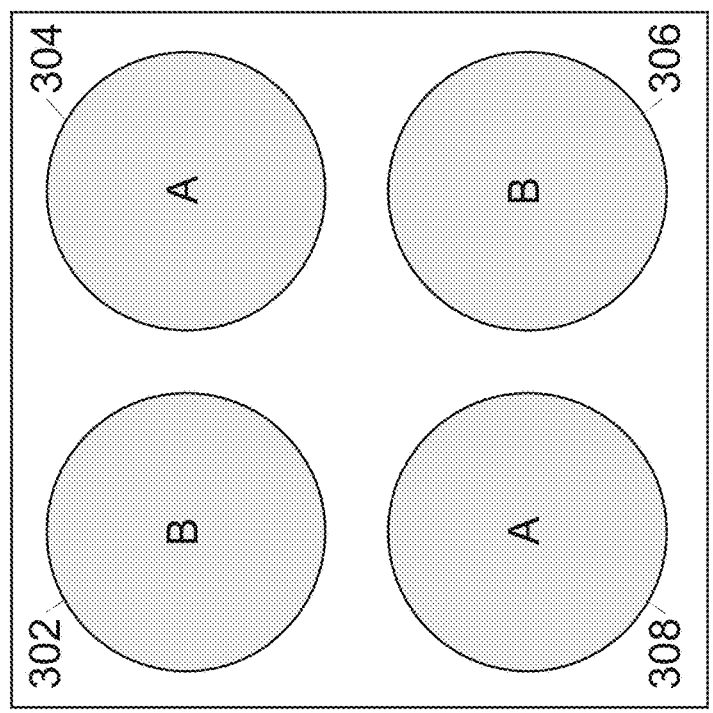
FIG. 3 illustrates an example of the location in the Fourier domain of the complex-valued pupil plane field data for wavelengths A and B.

The 2D Fourier transform of the recorded data appears as illustrated in FIG. 3, according to one or more aspects of the subject technology. The laser signal from laser A has wavelength A that is constant, and the laser signal from laser B has wavelength B that varies over time. Pupil plane complex-valued field data from laser A appears in the upper right (304) and lower left quadrants (308) in the spatial frequency domain, where one (304) is the conjugate twin of the other (308). Likewise, pupil plane complex-valued field data from laser B appears in the upper left (302) and lower right quadrants (306), where one (302) is the conjugate twin of the other (306).

Since laser A (101) and laser B (102) operate at different carrier frequencies, there will not be appreciable cross mixing of hologram A and hologram B present in the recorded frame. Furthermore, the spatial frequency domain will contain a large DC component which is the spatial autocorrelation function of each local oscillator (204/206) as well as the autocorrelation of the received signal (or returned light) which is cone shaped and centered at the origin. By making the irradiance of the local oscillators (204 and 206) much brighter than the received light (or returned light), the amplitude of the signal autocorrelation component becomes small and negligible. In one or more aspects, by cropping the Fourier transform to contain only one set of pupil A (304) data (not both 304 and 308) and performing inverse Fourier transform, a coherent image at wavelength A is formed. Likewise, in one or more aspects, a coherent image at wavelength B can be formed using only data in the pupil B (302) region (not both 302 and 306). This angular multiplexing of the two wavelengths (A and B) enables simultaneous recording of coherent images at each wavelength.

Figure 4:
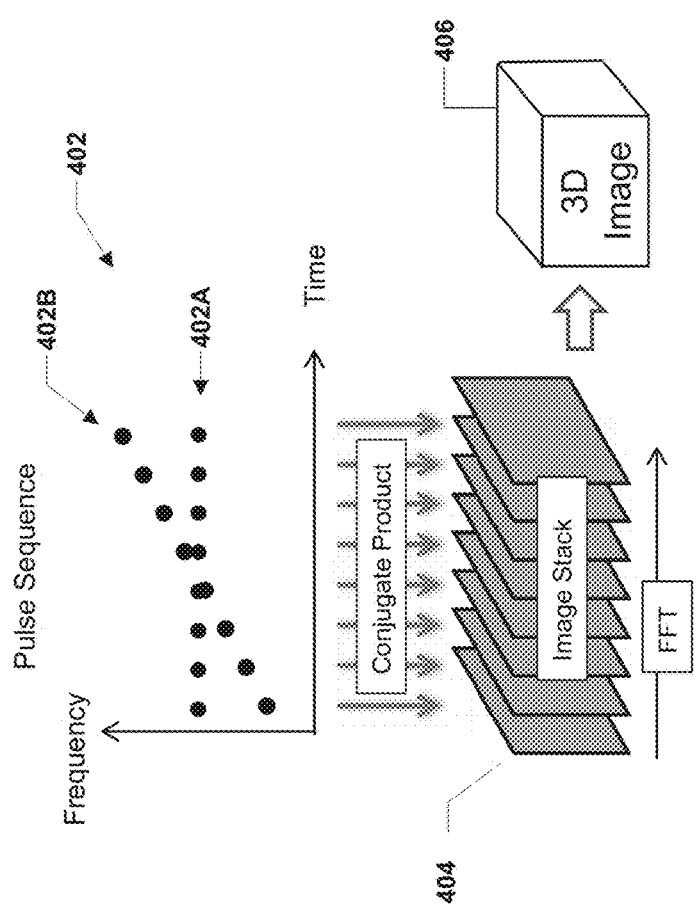
FIG. 4 illustrates an example of a top-level view of the time dependent frequency of the transmitted pulse sequence, and an example of a top-level view of the processing steps of conjugate product and FFT to produce a 3D image.

FIG. 4 illustrates an example of a top-level view of the time dependent frequency of the transmitted pulse sequence (402), and a top-level view of the processing steps of conjugate product and Fast Fourier Transform (FFT) to produce a 3D image, according to one or more aspects of the subject technology. A 3D image (406) is created by recording a sequence of angularly multiplexed holograms (404) where the frequency of the laser signal of laser B is tuned linearly and the frequency of the laser signal of laser A is held constant. In this example, the transmitted pulse sequence (402) includes a constant laser pulse sequence (402A) from laser A, and a linearly varying laser pulse sequence (402B) from laser B. Equivalently, the frequencies of the laser signal of laser A and the laser signal of laser B may both be tuned as long as the frequency difference $\Delta f_{AB}$ between them is linearly chirped, where $\Delta f_{AB} = f_A - f_B$ and $f_A$ is the carrier frequency of laser A and $f_B$ is the carrier frequency of laser B. In either case, two coherent images are formed for each frame of recorded data, one at wavelength A and the other at wavelength B.

According to one or more aspects of the subject technology, a phase difference image is then computed by taking the conjugate product of the two image plane data sets. This conjugate product image is denoted as E. This image E is equivalent to an image formed by the dual-wavelength digital holography method discussed above. This process is performed for each of the holograms in the stack of recorded frames. The result is a stack of conjugate product images (404) where the frequency offset of each is different. By performing a Fourier transform through the stack of conjugate product images, a 3D image (406) is formed.

This imaging approach compensates for target motion. There are two kinds of motion compensation present in this system: intra-pulse and inter-pulse. Intra-pulse target motion (or motion which occurs during the laser pulse or the FPA frame integration time), is addressed by simultaneous data collection at the two wavelengths. This prevents motion-induced speckle decorrelation between the data at the two wavelengths. If, alternatively, data at the two wavelengths was collected sequentially in time, motion-induced decorrelation could occur. Too much motion during the frame integration time may cause a loss of fringe visibility resulting in an efficiency penalty. The efficiency penalty may be reduced by using a pulsed laser system where the pulse duration is shorter than the coherence time of the returned light reflected off the target.

On the other hand, inter-pulse target motion is motion that occurs between frames. Compensating for this inter-pulse motion is the function of laser A, the constant frequency laser. For each recorded frame, the wavelength A coherent image provides a pixel-by-pixel phase reference for the wavelength B image, since motion alters the phase in each pixel of images A and B in nearly the same way. The conjugate product operation, producing the E image, shifts the phase in each pixel of image B by the negative of the amount measured at wavelength A, thereby removing any random phase change produced by target motion induced speckle decorrelation. In one or more implementations, this pixel-by-pixel motion compensation is a key element.

By sensing the target at a plurality of wavelengths, one or more aspects of the subject technology provide two key features: (1) high precision ranging with large ambiguity intervals and (2) range resolution. The range ambiguity is determined by the carrier frequency step size between adjacent wavelength measurements, Δf, according to $$R_{amb} = \frac{c}{2\Delta f} \quad (4)$$

where c is the speed of light. By setting the range ambiguity to be larger than the target depth, range ambiguity in the resulting image is eliminated. The range resolution is determined by the total bandwidth spanned by the N equally spaced wavelengths according to $$\Delta R = \frac{c}{2(N-1)\Delta f}. \quad (5)$$

For dual wavelength operation (N=2), $R_{amb}=\Delta R$, which results in no resolution capability. For multi-wavelength operation with the subject technology, the range resolution element is smaller than the ambiguity interval. The number of range resolution elements within an ambiguity interval is $$\frac{R_{amb}}{\Delta R} = N - 1. \quad (6)$$

Figure 5:
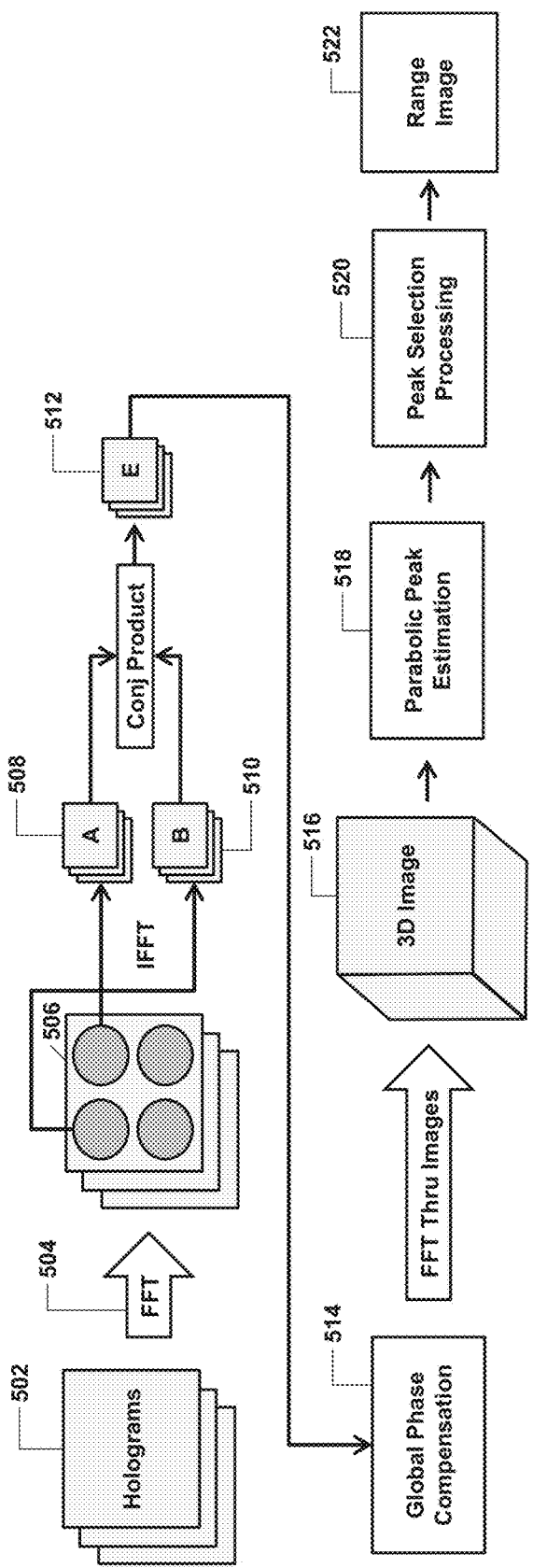
FIG. 5 illustrates an example of a diagram showing the processing steps to produce a 3D image of an illuminated target.

FIG. 5 illustrates a diagram showing an example of a processing sequence to produce a 3D image of an illuminated target, according to one or more aspects of the subject technology. First at the top left is an illustration of the stack of recorded holograms (502). For each hologram, the 2D Fourier transform (504) is computed using the FFT algorithm. By appropriate data cropping in the Fourier domain (506), a stack of coherent images is formed corresponding to laser A (508) and laser B (510). At this point in the processing, aberration correction may be performed to remove aberrations from imperfect optics or refractive turbulence using an image sharpness maximization method.

In some aspects, for each value of the wavelength separation, a conjugate product image is formed, which is denoted as E (512). There will likely be a random global phase shift on each of the conjugate product images due to radial target translation, frequency chirp nonlinearity, or local oscillator phase drift. This random global phase is removed using a global phase compensation operation (514), which is described in detail later with reference to FIG. 6. The operation uses standard nonlinear optimization routines to maximize the sharpness of the resulting 3D image (516).

After global phase compensation is completed (514), a cube of 3D data (516) is produced by one-dimensional (1D) Fourier transformation through the image stack for each pixel. Next, the peak range report for each pixel is computed with high precision by Fourier domain zero padding to produce interpolated points in the range dimension followed by parabolic peak estimation (518). A parabola is formed using three points at the peak and the location of the summit of the parabola is reported. A peak selection algorithm (520) may also be employed that seeks to reject noise reports by comparing the range report in each pixel to the neighboring pixels. If the value of the range report in a pixel exceeds the median of the neighborhood by more than the standard deviation of the neighborhood, the algorithm selects the next highest peak and the test is repeated. The final output is a range image (522).

Figure 6:
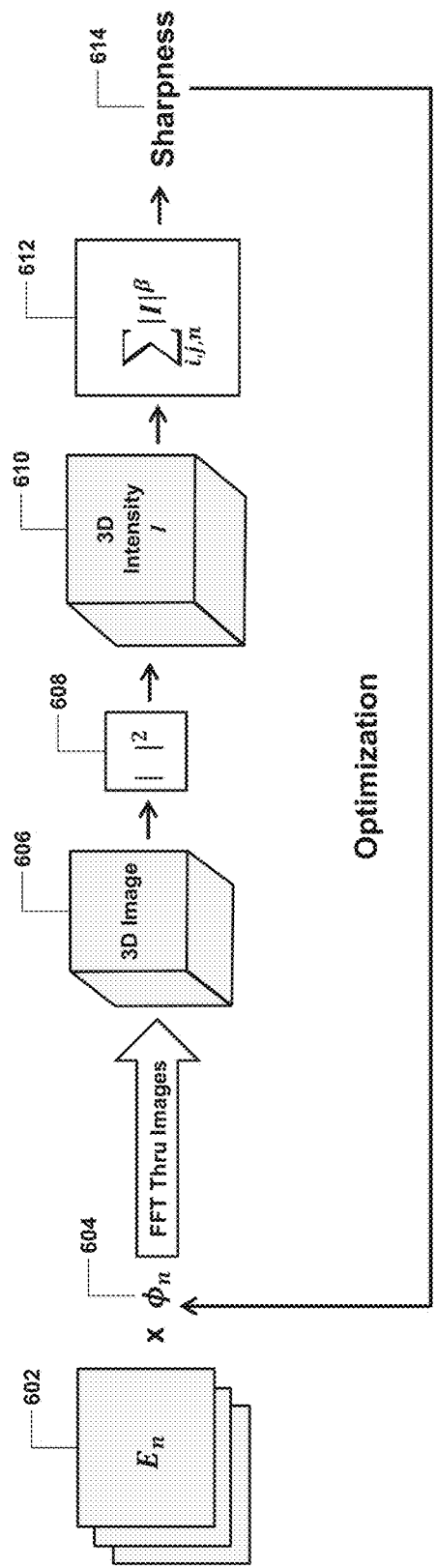
FIG. 6 is an example of a diagram describing the steps in the global phase estimation operation.

FIG. 6 is a diagram describing an example of the steps in the global phase compensation operation (514) of FIG. 5, according to one or more aspects of the subject technology. A guess for the global phase error for each of the images, $\phi_n$ (604), is applied to each pixel of the n-th conjugate product image, $E_n$ (602), followed by Fourier Transformation to create a 3D image (606). The 3D intensity image (I) (610) is computed by magnitude squared (608) of the complex-valued 3D image (606). The sharpness (614) is computed by I raised to an exponent β (usually β=1.2) and summing over all 3 dimensions (612). This produces a measure of the resulting sharpness (614) which the iterative optimization algorithm seeks to maximize.

Figure 7:
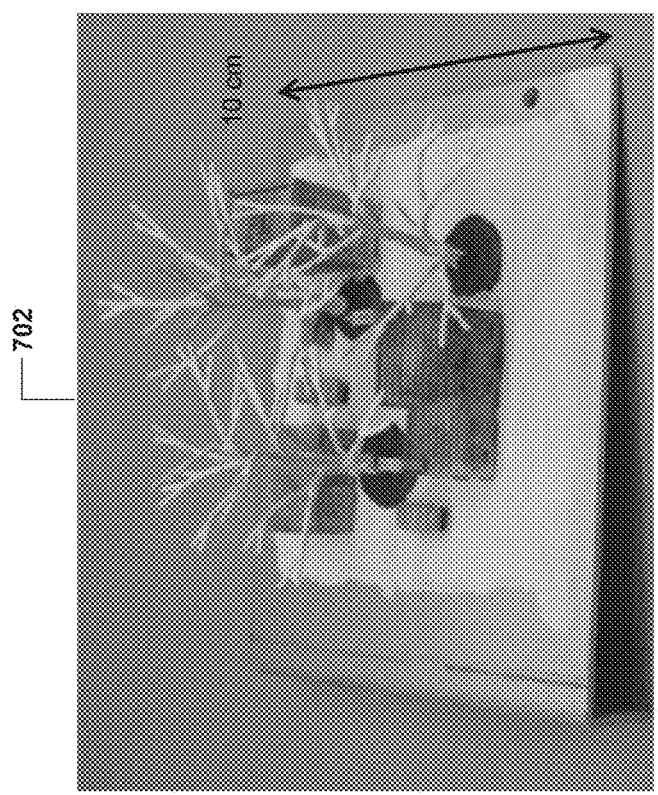
FIG. 7 illustrates an example of a photograph of a miniature model used as a test target.

FIG. 7 illustrates an example of a photograph of a miniature model used as a test target (702), according to one or more aspects of the subject technology. The subject technology has been reduced to practice and demonstrated. A miniature test target (702) was constructed containing many range discontinuities. The target scene includes miniature model trees, buildings and vehicles.

Figure 8:
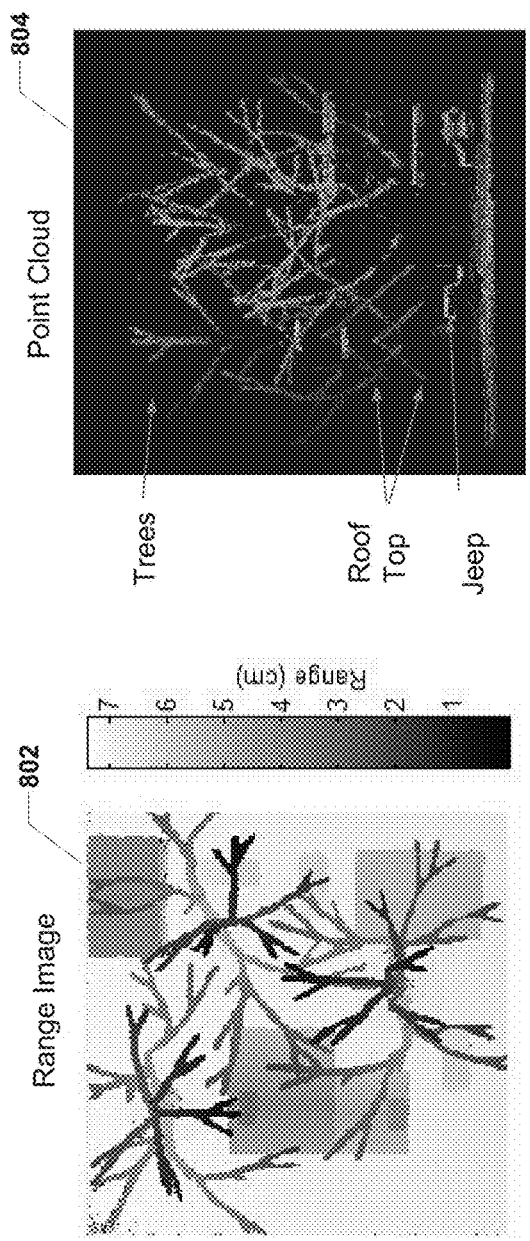
FIG. 8 illustrates an example of a range image and point cloud display of 3D imagery collected from the test target using the subject technology, demonstrating unambiguous high precision ranging.

FIG. 8 illustrates an example of a range image (802) and point cloud (804) display of 3D imagery collected from the test target (702), demonstrating unambiguous high precision ranging, according to one or more aspects of the subject technology. The test target (702) was imaged utilizing the subject technology. To demonstrate the motion compensation, the target was rotated 1 mrad between each collected frame, which is enough to fully decorrelate the speckle pattern since D/R=6 mm/3 m=1 mead. The resulting range image (802) and 3D point cloud image (804) demonstrate that the subject technology works and is able to image complex targets without range ambiguity.

Figure 9:
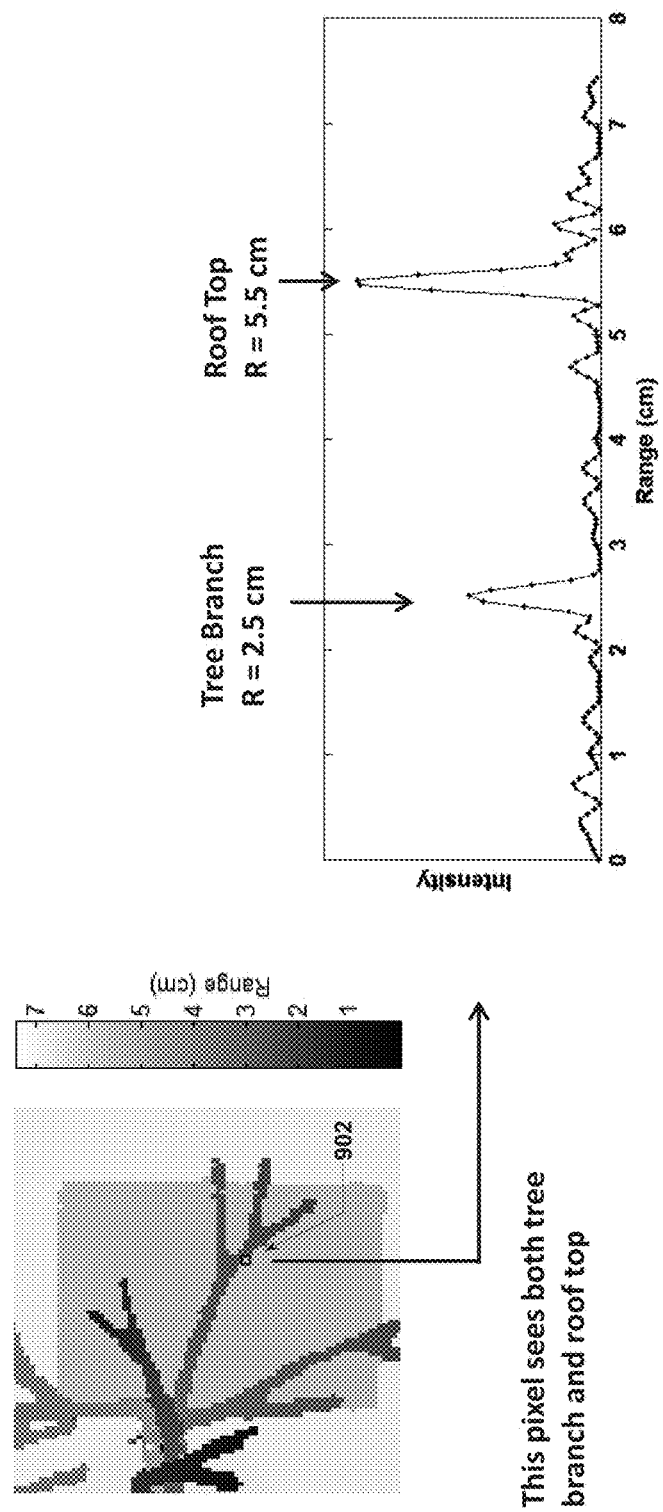
FIG. 9 illustrates an example of a range profile in a single pixel of the 3D data, demonstrating the range resolution capability.

FIG. 9 illustrates an example of a range profile in a single pixel of the 3D data demonstrating the range resolution capability, according to one or more aspects of the subject technology. This figure shows the range resolved return for a single pixel (902) which contains return from a tree branch and roof top.

Figure 10:
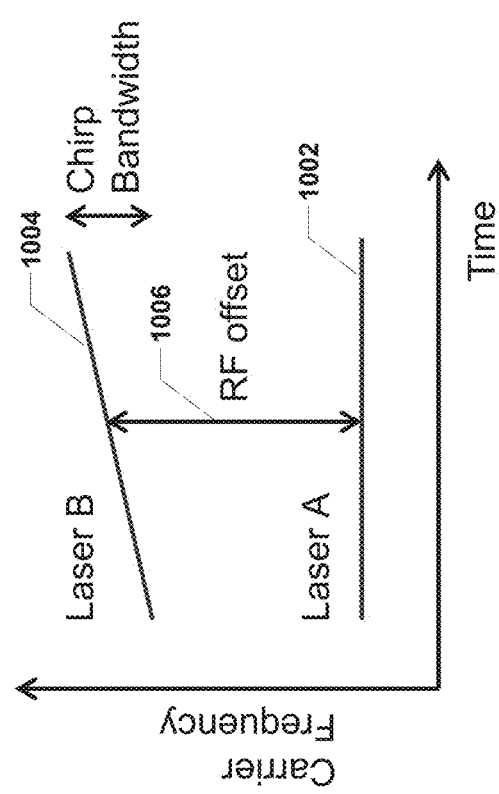
FIG. 10 illustrates an example of the offset frequency configuration for synthetic wavelength synthetic aperture ladar operation.

FIG. 10 illustrates an example of the offset frequency configuration for synthetic wavelength synthetic aperture ladar operation, according to one or more aspects of the subject technology. The subject technology may be applied to synthetic aperture ladar (SAL) and may solve the sensitivity to target motion problem inherent in SAL. As discussed above, the amount of uncompensated target motion for a 1.5 μm SAL system is only 8.4 nm RMS based on the SAR rule of thumb for uncompensated phase error. This extreme sensitivity to motion would prevent successful image formation for targets that move or vibrate beyond this very small tolerance. The subject technology may be configured with an arbitrary RF offset (1006) between the frequencies of the laser signals of lasers A and B (1002 and 1004) as depicted in FIG. 10.

The RF offset (1006) between the carrier frequencies of the two lasers (1002 and 1004) produces a synthetic wavelength which is a function of the center wavelengths of lasers A and B ($\lambda_A$ and $\lambda_B$).

$$\lambda_s = \frac{\lambda_A \lambda_B}{\lambda_B - \lambda_A} \quad (7)$$

The synthetic wavelength $\lambda_s$ can also be expressed as a function of the RF offset frequency, $f_{offset}$, as $$\lambda_s = \frac{c}{f_{offset}}. \quad (8)$$

Operation at a synthetic wavelength greatly reduces sensitivity to target motion at the expense of lengthening the synthetic aperture. Without a synthetic wavelength, the allowable margin on uncompensated phase error of 0.07 rads RMS translates to displacement in direct proportion to the laser wavelength.

$$\text{Allowable displacment RMS} = \frac{(.07 \text{ rad}) \lambda}{2\pi} \frac{\lambda}{2} \quad (9)$$

For operation at a synthetic wavelength, the allowable displacement scales directly with the synthetic wavelength, greatly increasing the motion tolerance. To reach an objective cross range resolution of the required length of the synthetic aperture, $D_{SA}$, is $$D_{SA} = \frac{R\lambda}{2\Delta x}, \quad (10)$$

where R is the range to the target and $\lambda$ is wavelength (synthetic or real).

The penalty of a longer synthetic aperture is longer data collection times. To illustrate, consider the standoff ISR imaging problem where 5 cm resolution imagery is desired from an airborne platform moving at 200 m/s from a range of 100 km. Assume 8 multi-look images are required for speckle noise mitigation. Table 1 shown below contains the allowable target motion and data collection time for a SAR system, an optical carrier SAL system and two configurations of the subject invention with RF offset equal to 1 THz and 100 GHz.

TABLE 1

| Approach | Carrier or Offset | λ (Real or Synthetic) | Allowable Motion | Synthetic Aperture | Collection Time |
|---|---|---|---|---|---|
| SAR | 10 GHz | 3 cm | 170 µm RMS | 30 km | 20 min |
| SAL | 200 THz | 1.5 µm | 8.4 nm RMS | 1.5 m | 60 ms |
| Invention | 1 THz | 300 µm | 1.7 µm RMS | 300 m | 12 sec |
| Invention | 100 GHz | 3 mm | 17 µm RMS | 3 km | 2 min |

Table 1 shows that the two configurations of the subject invention enable a variable balance between SAR, which has good motion tolerance but long data collection time, and SAL, which has a short data collection time but bad motion tolerance. The RF offset in the subject technology is a free parameter that may be adjusted on the fly in real time using a broadly tunable laser to provide a variable trade between motion tolerance and data collection time. The subject technology enables operation at a high RF offset without requiring the bandwidth of the receiver to be equal or greater than the RF offset. This is achieved by the simultaneous angularly multiplexed coherent detection at the two wavelengths. Imaging through anisoplanatic refractive turbulence causes problems very similar to random space-variant target motion. The above discussion of target motion applies equally to anisoplanatism.

Figure 11:
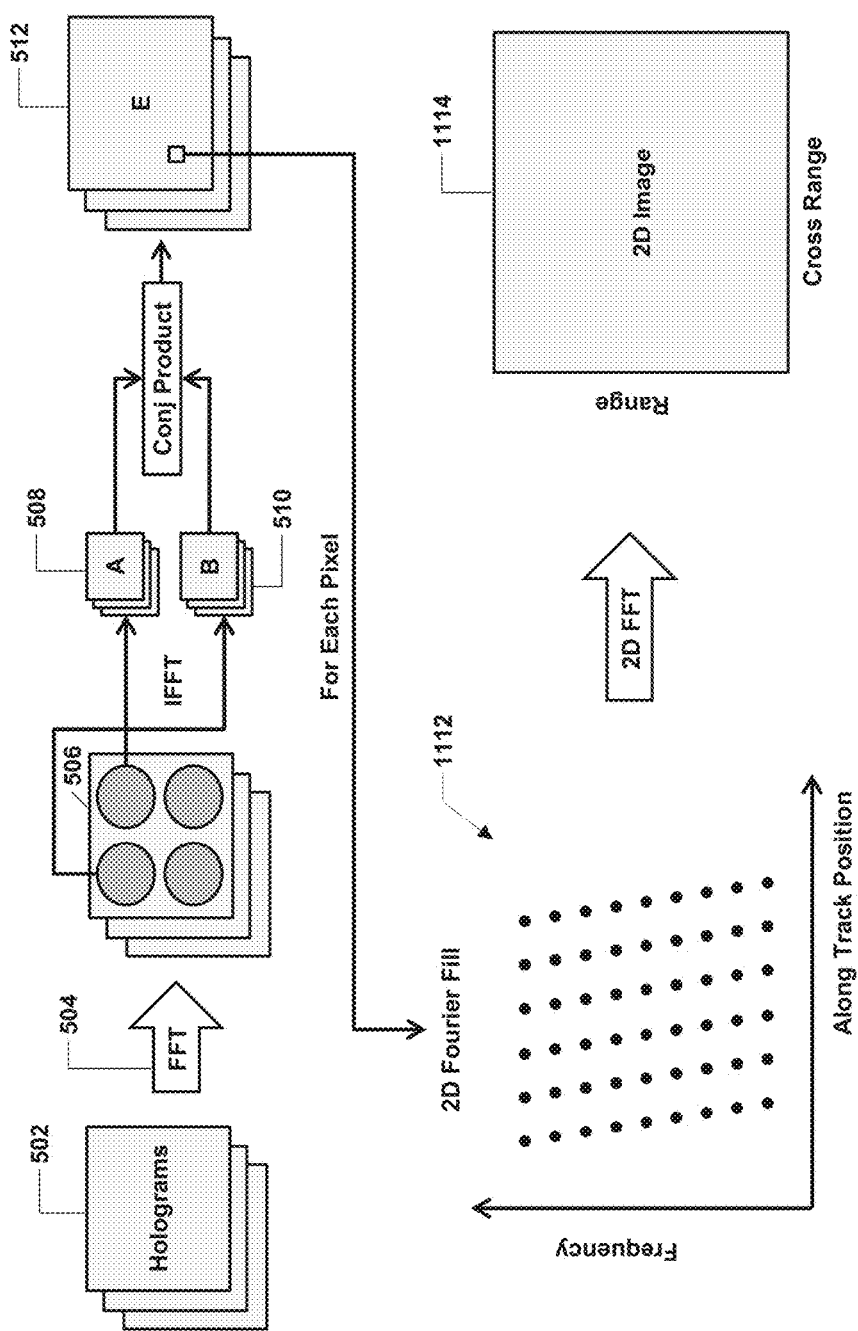
FIG. 11 illustrates an example of a diagram describing the data processing steps for synthetic aperture ladar operation.

FIG. 11 illustrates a diagram describing an example of a data processing sequence for synthetic aperture ladar operation, according to one or more aspects of the subject technology. The processing sequence (502 through 512) of generating the stack of E images (512) shown in FIG. 11 is the same as the processing sequence (502 through 512) described with reference to FIG. 5. A stack of data, or a stack of data points, (e.g., a stack of data as seen along an axis perpendicular to a horizontal plane) of each pixel (e.g., each pixel on the horizontal plane) within the stack of E images (512) provides complex-valued data that fills a 2D Fourier space (1112). Each data point is collected at a different frequency and along track position, where the frequency is the specific value of the offset frequency determined by the overall offset of the two laser frequencies combined with the specific frequency of the laser signal of laser B as it is being chirped. These data points are arranged in a 2D space (1112). A 2D Fourier transform along with standard autofocus operations produces a range/cross range 2D image of the scene (1114). The stack of data in each pixel of the E image is transformed into a 2D SAL image. The SAL images from all pixels are then stitched together to produce a wide area image (not shown in FIG. 11).

Figure 12:
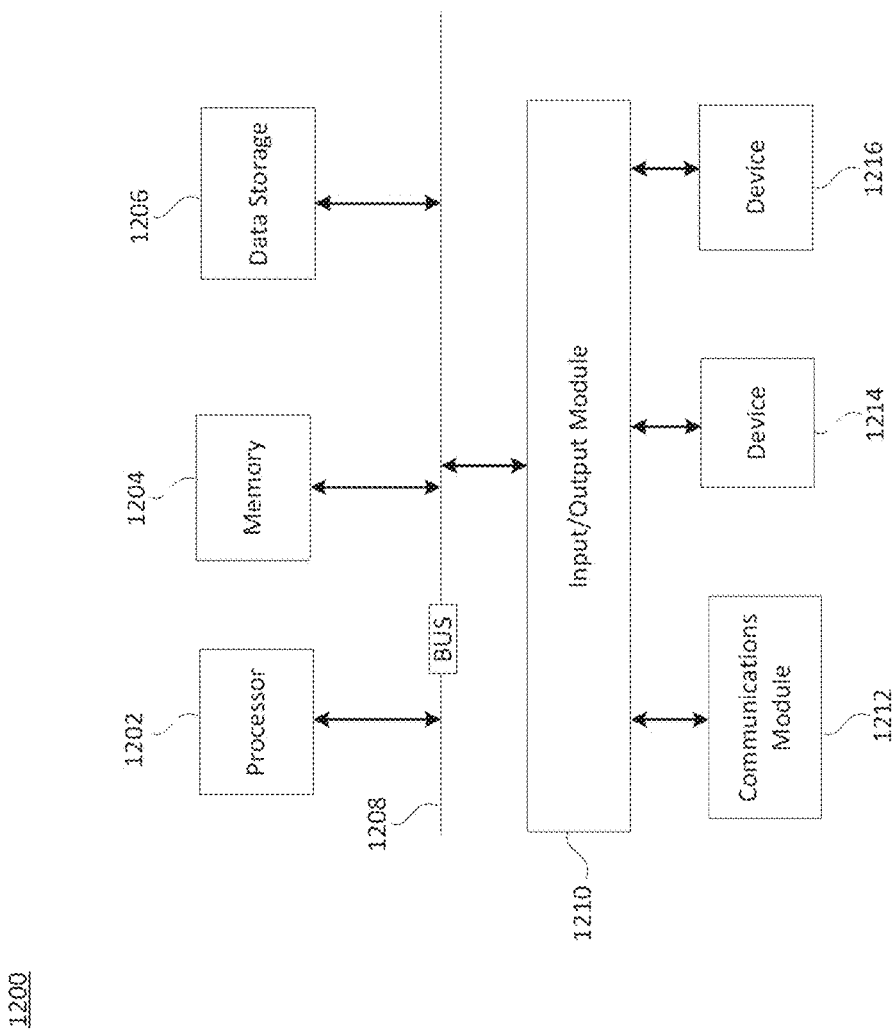
FIG. 12 is a block diagram illustrating an example of a computer system with which one or more configurations of the subject technology may be implemented.

FIG. 12 is a block diagram illustrating an example of a computer system that may be implemented utilizing the subject technology. A computer system (1200) may represent a computer system such as the computer system (140). In certain aspects, computer system (1200) may be implemented using hardware or a combination of software and hardware, either in a dedicated computer or server, integrated into another entity, or distributed across multiple entities.

The computer system (1200) includes a bus (1208) or other communication mechanism for communicating information, and a processor (1202) coupled with the bus (1208) for processing information. By way of example, the computer system (1200) may be implemented with one or more processors (1202). The processor (1202) may include one or more processors. The processor (1202) may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system (1200) may include, in addition to hardware, code that creates an execution environment for the computer program in question, e.g., code that constitutes processor firmware, a protocol stack, a database management system, an operating system, or a combination of one or more of them stored in a memory (1204), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to the bus (1208) for storing information and instructions to be executed by the processor (1202). The processor (1202) and the memory (1204) may be supplemented by, or incorporated in, special purpose logic circuitry.

The instructions may be stored in the memory (1204) and implemented in one or more computer program products, i.e., one or more modules of computer program instructions encoded on a machine readable medium for execution by, or to control the operation of, the computer system (1200). Instructions may be implemented in various computer languages. The memory (1204) may be used for storing temporary variable or other intermediate information during execution of instructions to be executed by the processor (1202).

A computer program may be deployed to be executed on one computer or on multiple computers that are located at one site or distributed across multiple sites and interconnected by a communication network. The processes and logic flows described in this specification may be performed by one or more programmable processors executing one or more computer programs to perform functions by operating on input data and generating output.

The computer system (1200) may further include a data storage device (1206) such as a magnetic disk, optical disk or solid-state disk, Static Random Access Memory (SRAM) and Dynamic Random Access Memory (DRAM), coupled to the bus (1208) for storing information and instructions. The computer system (1200) may be coupled via an input/output module (1210) to various devices. The input/output module (1210) may be any input/output module. The input/output module (1210) is configured to connect to a communications module (1212). Examples of communications modules (1212) include networking interface cards. In certain aspects, the input/output module (1210) is configured to connect to a plurality of devices, such as an input device (1214) and/or an output device (1216).

The computer system (1200) may include additional components not shown in FIG. 12 or may operate with less components than those illustrated in FIG. 12. The term "machine-readable storage medium" or "computer readable medium" as used herein refers to any medium or media that participates in providing instructions or data to processor (1202) for execution. Such a medium may be one or more media and may take many forms, including, but not limited to, non-volatile media, and volatile media.

Examples of Illustrations of Subject Technology as Clauses

Various examples of aspects of the disclosure are described below as clauses. These are provided as examples, and do not limit the subject technology.

A digital holography imaging system comprising:
a first laser operated with constant frequency;
a second laser operated with linear frequency modulation enforced with a frequency control servo or stepped frequency changes with equal step size;
flood illumination of a target with the first laser and the second laser simultaneously;
a detector array;
a receiver optical system that focuses returned light onto the detector array;
a first illumination point source wherein the first illumination point source radiates a portion of the output from the first laser, the location of the first illumination point source is in-plane with the pupil of the receiver optical system, the first illumination point source directs the illumination onto the detector array, and the geometric relationship between the first illumination point source and the pupil of the receiver optical system is as illustrated in FIG. 2;
a second illumination point source wherein the second illumination point source radiates a portion of the output from the second laser, the location of the second illumination point source is in-plane with the pupil of the receiver optical system, the second illumination point source directs the illumination onto the detector array, and the geometric relationship between the second illumination point source and the pupil of the receiver optical system is as illustrated in FIG. 2;
simultaneous illumination of the focal plane array from the first illumination point source, the second illumination point source, and returned light from a target.

A system (or a system of any one of the clauses), including a data processing method comprising:
2D Fourier transformation of each recorded frame;
data cropping in a first quadrant (not two quadrants) of the Fourier domain to segregate pupil plane optical field data from the first laser and inverse 2D Fourier transformation to obtain a first set of complex-valued coherent images corresponding to the first laser;
data cropping in a second quadrant (not two quadrants) of the Fourier domain to segregate pupil plane optical field data from the second laser and inverse 2D Fourier transformation to obtain a second set of complex-valued coherent images corresponding to the second laser;
conjugate product combination of each frame of the first set of coherent images with each corresponding frame of the second set of coherent images producing a set of conjugate product images in which target motion induced phase errors between frames are removed on a pixel-by-pixel basis due to shifting the phase in the second set of coherent images by the phase measured in each pixel of the first set of coherent images that results from the conjugate product operation;
if multiple holograms are recorded at the same frequency offset, average together the conjugate product images corresponding to a common frequency offset to produce an improved set of conjugate product images.

A system of any one of the clauses, including a 3D image formation data processing method comprising:
a global phase compensation algorithm that removes global phase errors between frames of the conjugate product images using a 3D image sharpness metric maximization approach with standard nonlinear optimization algorithms;
a 1D Fourier transformation through the frames producing a 3D image;
if multiple 3D images are collected, combine them by averaging the intensities;
a peak estimation algorithm wherein interpolated range points are calculated using Fourier domain zeropadding, a parabola is fit to the peak value and 2 adjacent values, and the summit of the parabola is reported as the range report;
a peak selection algorithm wherein the range report in each pixel is compared to the median the range reports in a neighborhood of pixels, and if the range report exceeds the median of the neighbors by an amount greater than the standard deviation of the neighbors, the report is rejected and the test is repeated for the next highest peak until a report is found that satisfies the criteria and if none are found then the highest peak is reported.

A system of any one of the clauses, wherein the imaging system is operated on a moving platform in a translational synthetic aperture imaging configuration, or the imaging system observes a rotating target in an inverse synthetic aperture imaging configuration (where target rotation provides a diversity of look angles), or some combination of both configurations.

A system of any one of the clauses, including a synthetic aperture ladar image formation data processing method comprising:

two dimensional arrangement the data in each pixel of the conjugate product images wherein the placement of the data in the 2D space is done according to the specific values of the offset frequency and the along track position at the time the data was recorded;

application of standard autofocus algorithms as appropriate;

2D Fourier transformation to produce a 2D SAL image from the data in a single pixel of the conjugate product image;

formation of individual 2D SAL images for all pixels of the conjugate product image set according to the above steps;

incoherently average together multi-look SAL images as appropriate, where each multi-look image is obtained at a different along-track position to produce independent realizations of speckle noise;

stitch together all the individual 2D SAL images into a larger wide area SAL image.

A system of any one of the clauses, wherein the detector array is placed in the pupil plane or any intermediate plane of the receiver optical system A system of any one of the clauses, further comprising one or more laser amplifiers that amplify the power of the first laser and/or the second laser.

A system of any one of the clauses, wherein the Fourier tranformations are computed using the FFT algorithm.

A system of any one of the clauses, wherein the lasers and/or laser amplifiers are operated in continuous wave mode.

A system of any one of the clauses, wherein the lasers and/or the laser amplifiers are operated in pulsed mode where the input to the amplifiers are pulsed using a first amplitude modulator and the first and the second illumination point source are operated in pulsed mode where the pulse is generated using a second and third amplitude modulator and timing of the first and second illumination pulses are arranged to overlap the time the returned single pulse is received.

A system (or a system of any one of the clauses), having motion compensation by using data from one laser as a pixel-by-pixel phase reference for the other.

A system (or a system of any one of the clauses), having simultaneous dual wavelength operation where the frequency separation is linearly tuned.

A system (or a system of any one of the clauses), having pupil plane angular multiplexing of the two wavelengths in a coherent digital holography receiver.

A system (or a system of any one of the clauses), having operation with an RF offset between the two lasers to produce a synthetic wavelength that reduces target motion sensitivity for synthetic aperture ladar.

Other Descriptions

In one aspect, clauses herein, if any, may depend from any one of the independent clauses or any one of the dependent clauses. In one aspect, any clause (e.g., dependent or independent clauses) may be combined with any other one or more clauses (e.g., dependent or independent clauses). In one aspect, a claim may be amended to depend from one or more other claims or may be amended to be combined with one or more other claims. In one aspect, a claim may be amended to include some or all of the words (e.g., steps, operations, means or components) recited in one or more clauses, one or more sentences, one or more phrases, one or more paragraphs, or one or more claims. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow(s)/line(s). In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention. The word exemplary is used to mean serving as an example or illustration. Like components are labeled with identical element numbers for ease of understanding.

To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

Various items may be arranged differently (e.g., arranged in a different order, or partitioned in a different way) all without departing from the scope of the subject technology.

It is understood that the specific order or hierarchy of steps, operations or processes disclosed is an illustration of exemplary approaches. Unless explicitly stated otherwise, it is understood that the specific order or hierarchy of steps, operations or processes may be rearranged. Some of the steps, operations or processes may be performed simultaneously. The accompanying method claims, if any, present elements of the various steps, operations or processes in a sample order, and are not meant to be limited to the specific order or hierarchy presented.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, summary, brief description of the drawings, abstract, and appended drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A holography imaging system, comprising:
   a first laser configured to generate an output having a constant frequency;
   a second laser configured to generate an output having a non-constant frequency;
   a transmitter optical system configured to illuminate a target simultaneously using a first portion of the output of the first laser and a first portion of the output of the second laser;
   a detector array;
   a receiver optical system configured to receive a returned light from the illuminated target and focus the returned light onto the detector array;
   a first illumination point source configured to radiate a second portion of the output of the first laser, wherein a location of the first illumination point source is in-plane with a pupil of the receiver optical system, and the first illumination point source is configured to direct the second portion of the output of the first laser onto the detector array; and a second illumination point source configured to radiate a second portion of the output of the second laser, wherein a location of the second illumination point source is in-plane with the pupil of the receiver optical system, and the second illumination point source is configured to direct the second portion of the output of the second laser onto the detector array, wherein the holography imaging system is configured to detect simultaneously holograms formed on the detector array based on the returned light, the second portion of the output of the first laser, and the second portion of the output of the second laser.

2. The holography imaging system of claim 1,
wherein the returned light comprises a first returned light and a second returned light, wherein the first returned light is based on the first portion of the output of the first laser, wherein the second returned light is based on the first portion of the output of the second laser,
wherein the holograms comprise a first hologram and a second hologram,
wherein the first hologram is based on the first returned light and the second portion of the output of the first laser,
wherein the second hologram is based on the second returned light and the second portion of the output of the second laser,
wherein the first portion of the output of the first laser comprises a first wavelength, wherein the second portion of the output of the first laser comprises the first wavelength, wherein the first returned light comprises the first wavelength, wherein the first hologram comprises the first wavelength,
wherein the first portion of the output of the second laser comprises a second wavelength, wherein the second portion of the output of the second laser comprises the second wavelength, wherein the second returned light comprises the second wavelength, wherein the second hologram comprises the second wavelength,
wherein the first wavelength is different from the second wavelength, and
wherein the holography imaging system is configured to detect the first hologram and the second hologram simultaneously.

3. The holography imaging system of claim 1, wherein the second laser is configured to operate with linear frequency modulation enforced with a frequency control servo.

4. The holography imaging system of claim 1, wherein the second laser is configured to operate with stepped frequency changes with an equal step size.

5. The holography imaging system of claim 1,
wherein the first and second illumination point sources are in an exit pupil plane of the receiver optical system,
wherein the receiver optical system has the exit pupil plane, and a (x,y) coordinate system is defined in the exit pupil plane, wherein an exit pupil is centered at coordinates (0,0),
wherein the first illumination point source is located at coordinates $$\left(-\frac{Q_1 D}{4}, -\frac{Q_1 D}{4}\right),$$

wherein D is an exit pupil diameter, and $Q_1$ is a sampling ratio, defined as $$Q_1 = \frac{z_i \lambda_1}{Dp},$$

wherein $z_i$ is a distance between the exit pupil and the detector array, $\lambda_1$ is a wavelength of the first laser, and p is a pixel pitch of the detector array.

6. The holography imaging system of claim 5,
wherein the second illumination point source is located at coordinates $$\left(\frac{Q_2 D}{4}, -\frac{Q_2 D}{4}\right),$$

wherein D is the exit pupil diameter, and $Q_2$ is a sampling ratio, defined as $$Q_2 = \frac{z_i \lambda_2}{Dp},$$

wherein $\lambda_2$ is a wavelength of the second laser, and p is the pixel pitch of the detector array.

7. The holography imaging system of claim 1, wherein the detector array is located in a pupil plane of the receiver optical system.

8. The holography imaging system of claim 1, wherein the detector array is located in an intermediate plane of the receiver optical system.

9. The holography imaging system of claim 1, comprising one or more laser amplifiers configured to amplify at least one of a power of the first laser or a power of the second laser.

10. The holography imaging system of claim 1, wherein at least one of the first laser, the second laser, or one or more laser amplifiers is configured to operate in a continuous wave mode.

11. The holography imaging system of claim 9, wherein at least one of the first laser, the second laser, or the one or more laser amplifiers is configured to operate in a continuous wave mode.

12. The holography imaging system of claim 1, comprising one or more amplitude modulators,
wherein the holography imagining system is configured to operate in a pulse mode,
wherein the first portion of the output of the first laser comprises a first pulse,
wherein the first portion of the output of the second laser comprises a second pulse,
wherein the returned light comprises a returned pulse, wherein the returned pulse is based on the first pulse and the second pulse,
wherein the second portion of the output of the first laser comprises a third pulse,
wherein the second portion of the output of the second laser comprises a fourth pulse,
wherein the holography imaging system is configured to illuminate the target with the first and second pulses simultaneously,
wherein the holography imaging system is configured to detect simultaneously the holograms formed on the detector array based on the returned pulse, the third pulse and the fourth pulse, and
wherein a pulse duration of the returned pulse is shorter than a coherence time of the returned pulse.

13. The holography imaging system of claim 9, comprising one or more amplitude modulators,
wherein the holography imagining system is configured to operate in a pulse mode,
wherein the first portion of the output of the first laser comprises a first pulse,
wherein the first portion of the output of the second laser comprises a second pulse,
wherein the returned light comprises a returned pulse, wherein the returned pulse is based on the first pulse and the second pulse,
wherein the second portion of the output of the first laser comprises a third pulse,
wherein the second portion of the output of the second laser comprises a fourth pulse,
wherein the holography imaging system is configured to illuminate the target with the first and second pulses simultaneously,
wherein the holography imaging system is configured to detect simultaneously the holograms formed on the detector array based on the returned pulse, the third pulse and the fourth pulse, and
wherein a pulse duration of the returned pulse is shorter than a coherence time of the returned pulse.

14. The holography imaging system of claim 1, comprising:
one or more memories comprising instructions stored therein; and
a processor configured to execute instructions to:
record the holograms formed on the detector array,
transform the recorded holograms using two-dimensional Fourier transformation into transformed data in a Fourier domain;
perform data cropping on the transformed data in a first portion of the Fourier domain to segregate first pupil plane optical field data associated with the first laser, and perform inverse two-dimensional Fourier transformation on the first pupil plane optical field data to obtain a first set of complex-valued coherent images associated with the first laser;
perform data cropping on the transformed data in a second portion of the Fourier domain to segregate second pupil plane optical field data associated with the second laser, and perform inverse two-dimensional Fourier transformation on the second pupil plane optical field data to obtain a second set of complex-valued coherent images associated with the second laser, wherein the second portion is different from the first portion; and
perform conjugate product combination of each frame of the first set of complex-valued coherent images with each corresponding frame of the second set of complex-valued coherent images to produce a set of conjugate product images.

15. The holography imaging system of claim 14, wherein the instructions to perform conjugate product combination comprises removing target motion induced phase errors between the frames, of the first set of complex-valued coherent images and the second set of complex-valued coherent images, on a pixel-by-pixel basis by shifting a phase in each pixel of the frames of the second set of complex-valued coherent images using a phase measured in a corresponding pixel of the frames of the first set of complex-valued coherent images.

16. The holography imaging system of claim 14, wherein the processor is configured to execute instructions to average together frames of the set of conjugate product images, wherein each frame in the set of conjugate product images to be averaged is collected at a common offset frequency between the first and second lasers, to produce a second set of conjugate product images.

17. The holography imaging system of claim 14, wherein the processor is configured to execute instructions to perform a three-dimensional image formation data processing operation, wherein the three-dimensional image formation data processing operation comprises:
a global phase compensation operation to remove global phase errors between images of the set of conjugate product images to produce a third set of conjugate product images;
a one-dimensional Fourier transformation operation performed on each lateral element of the third set of conjugate product images to produce a 3D image;
a peak estimation operation to compute a range for each lateral element in the 3D image, comprising Fourier domain zero-padding to compute interpolated range points and fitting a parabola to a peak interpolated point along with two adjacent points, wherein a summit of the parabola is a range report;
a peak selection operation wherein (a) a lateral element is selected for processing, (b) a neighborhood of lateral element range reports is defined surrounding the selected lateral element, (c) a median of the neighborhood range reports is computed, (d) a standard deviation of the neighborhood range reports is computed, and (e) the range report of the selected lateral element is compared to the median, wherein if a difference between the range report and the median is less than or equal to the standard deviation, accepting the range report, and if not, rejecting the range report and repeating the above test of (b) through (e) for the next highest peak in the selected lateral element, and then repeating the above process of (a) through (e) for each lateral element in the 3D image.

18. The holography imaging system of claim 14, wherein the holography imaging system is configured to operate on a moving platform in a translational synthetic aperture imaging configuration, the holography imaging system is configured to observe a rotating target in an inverse synthetic aperture imaging configuration, wherein target rotation provides a diversity of look angles, or the holography imaging system is configured to operate using a combination of both of the configurations.

19. The holography imaging system of claim 14, wherein the processor is configured to execute instructions to perform a synthetic aperture ladar image formation data processing operation, wherein the synthetic aperture ladar image formation data processing operation comprises:
for each lateral element of the set of conjugate product images, arranging data in the each lateral element into a two dimensional space, based on a value of an offset frequency and an along track position, wherein the value of an offset frequency is determined based on a difference between the first and second laser frequencies, wherein a value of the along track position is determined based on a relative position of a platform along the platform's trajectory and the target;
applying an autofocus operation on at least some of the data in the two dimensional space;

for each lateral element of the set of conjugate product images, applying two-dimensional Fourier transformation on the data in the two dimensional space corresponding to the lateral element, to produce a two-dimensional synthetic aperture ladar (2D SAL) image corresponding to each lateral element of the set of conjugate product images;

incoherently averaging the 2D SAL images, wherein the 2D SAL images are multi-look images; and stitching together all of the 2D SAL images into a larger wide area SAL image.

20. The holography imaging system of claim 19, wherein the incoherently averaging the 2D SAL images comprises averaging together the 2D SAL images, wherein each of the 2D SAL images to be averaged is collected with independent speckle realizations.

* * * * *